April 18, 1961 S. M. GOLDFUS 2,980,379

DETACHABLE SUPPORTING RACK

Filed June 23, 1958

Inventor
Samuel M. Goldfus
By Mueller & Aichele
Att'ys

United States Patent Office 2,980,379
Patented Apr. 18, 1961

2,980,379

DETACHABLE SUPPORTING RACK

Samuel M. Goldfus, Lincolnwood, Ill., assignor to Motorola, Inc., Chicago, Ill., a corporation of Illinois Filed June 23, 1958, Ser. No. 743,612

4 Claims. (Cl. 248—206)

This invention relates to racks for supporting radio receivers and more particularly to a rack adapted to be mounted on a flat surface such as a window in order to support a small portable radio receiver with its aerial in close proximity to such surface in order to improve reception.

The widespread use of portable radio receivers has created a demand for means of improving the reception of such receivers when they are used inside buildings or inside moving vehicles such as trains or airplanes. The steel framework of a building or the metal bodies of railroad cars or airplanes acts as a shield and reduces the signal reaching the receiver. In order to improve reception, separate aerials have been provided which can be fastened to a window by suction cups or the like. However, the provision of the separate aerial is somewhat cumbersome and inconvenient. Various bracket or rack structures have been proposed for mounting to a window or similar surface but these structures have failed to provide adequate support for the receiver particularly when it is used in a vehicle subject to changes in speed and direction of motion.

It is an object of the present invention, therefore, to provide a small and conveniently portable rack for holding a small portable radio receiver securely and detachably against a supporting surface.

It is a further object of the invention to provide a rack for supporting a portable radio receiver so that the aerial of the radio receiver is in close proximity to a window in order to improve reception.

A feature of the invention is a rack having suction cups attached thereto for supporting the same from a smooth surface and which includes a pair of arms each with an elbow portion for supporting projections extending from the side of a portable radio receiver.

Another feature of the invention is the provision of a rack including a mounting plate and arms foldably secured thereto, with projections extending from the mounting plate to confine the arms when they are in position to receive the case of the radio receiver and provide firm support therefor.

A further feature of the invention is the provision of a rack having a pair of J-shaped arms with the longer portion of the J tilted toward a mounting plate on which the arms are positioned so that the antenna and handle of a portable radio receiver supported by the arms can be in close proximity to a window or similar surface upon which the rack is mounted.

Still another feature of the invention is the provision of a mounting rack with arms as aforesaid on which are provided ear portions mounted in a slightly off-set position in order to provide a shoulder against which the edge of an antenna-carrying handle of a portable receiver may rest.

In accordance with the present invention, a rack for mounting a small portable radio receiver includes a mounting plate with means such as suction cups on one of its faces for securing the plate to a surface, and further having a pair of arms pivotally carried at opposite edges of the mounting plate on the other face. Each of the arms is generally J-shaped and has a crooked end or elbow portion adapted to support projections extending from the sides of a portable radio receiver such as the projections at the base of an antenna-carrying handle for the receiver. The longer portion of the J-shaped arms is slanted toward the surface upon which the rack is to be mounted so that a receiver held between the arms will tilt backwardly toward the window or similar surface with its aerial in close proximity thereto in order to improve reception. The mounting plate has projections adapted to confine the arms when in their extended position so that they closely engage the receiver and also to hold the arms flat against a surface of the plate when they are pivoted to their folded position.

Figure 1:
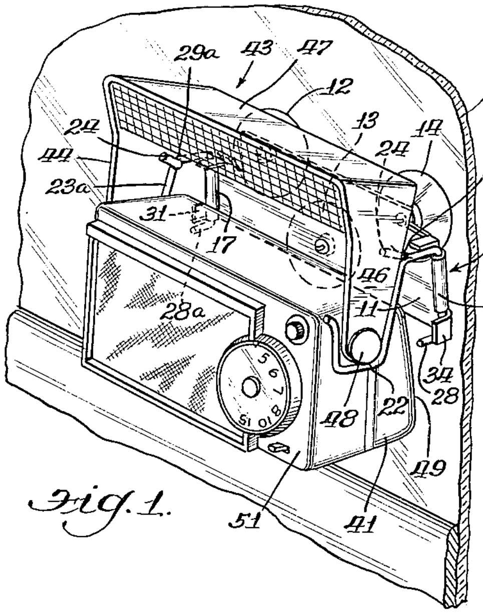
Fig. 1 is a perspective view showing a rack in accordance with the present invention mounted on a window and carrying a portable radio receiver.
Figure 2:
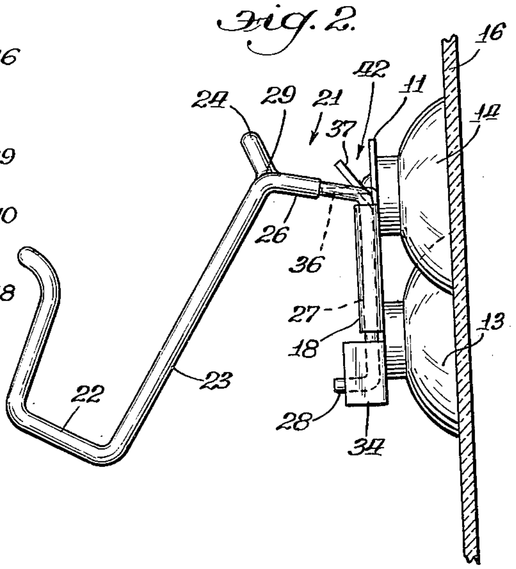
Fig. 2 is a view in side elevation of the rack in its mounted position.

The rack generally indicated at 10 in Fig. 1 includes a generally flat mounting plate 11 having suction cups 12, 13 and 14 extending from one face thereof. As shown in Figs. 1 and 2, the suction cups serve to secure the rack 10 to a vertically disposed surface such as the window pane 16. At opposite ends of the plate 11 and on the face opposite that from which the suction cups extend are turned over sleeve portions 17 and 18 within which the arms 19 and 21 fit slidably.

As more particularly shown in Fig. 2, the arm 21 is generally J-shaped and includes a crooked elbow portion 22, a longer slanted portion 23 which is inclined toward the plane of the mounting plate 11, a retaining finger 24, a portion 26 extending generally perpendicular to the plane of the mounting plate, a shank portion 27 held within the sleeve 18 and a turned out end 28. The arm is made of a metal wire bent in a single plane with the exception of the retaining finger 24 which is displaced slightly from the plane of the rest of the arm so that it forms a shoulder portion indicated at 29. The arm 21 is covered with rubber up to about the middle of the portion 26 to prevent scoring of the case of a supported receiver. The other arm 19 is of the same configuration as the arm 21 and the corresponding portions thereof are indicated by the same reference characters with the letter "*a*" appended; thus, the elbow portion of arm 19 is indicated at **22*a***.

The edge of the mounting plate 11 at which the arm 19 is hinged has a turned-over flange 31 (Fig. 3) near the bottom of the plate and a turned over flange 32 at its top edge on the other side of the sleeve 17. A lug portion 33 bent out from the surface of the plate 11 at an angle forms a stop for the arm 19 when the latter is folded against the surface of the plate. The other edge of the mounting plate adjacent the arm 21 has generally corresponding parts with turned over flanges 34 and 36 and lug 37.

Figure 4:
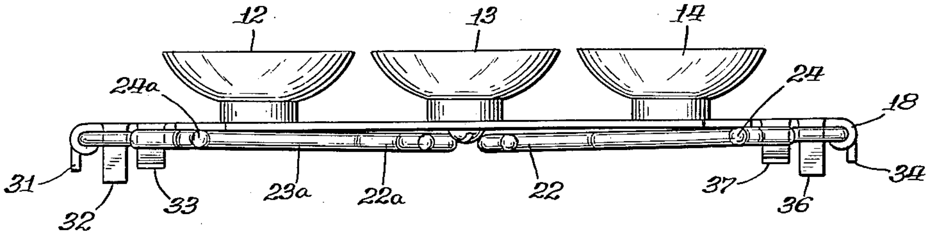
Fig. 4 is a top view of the rack with the arms in the folded position assumed when the rack is not in use.

When it is desired to use the rack 10 to mount a portable radio receiver, such as the receiver 41 shown in Fig. 1, the suction cups 12, 13 and 14 are secured to the window 16 and the arms 19 and 21 are folded out to their extended positions shown in Fig. 1. When the rack 10 is not in use the arms 19 and 21 are folded flat against the face of the mounting plate 11 as shown in Fig. 4. In this position the portion 26 of the arm 21 bears against and is held behind the slanted lug 37 which cooperates with the flat surface of the mounting plate 11 to form what is effectively a V-shaped notch such as is indicated at 42 in Fig. 2. The arm 19 is similarly held in place by the slanted finger 33.

Figure 3:
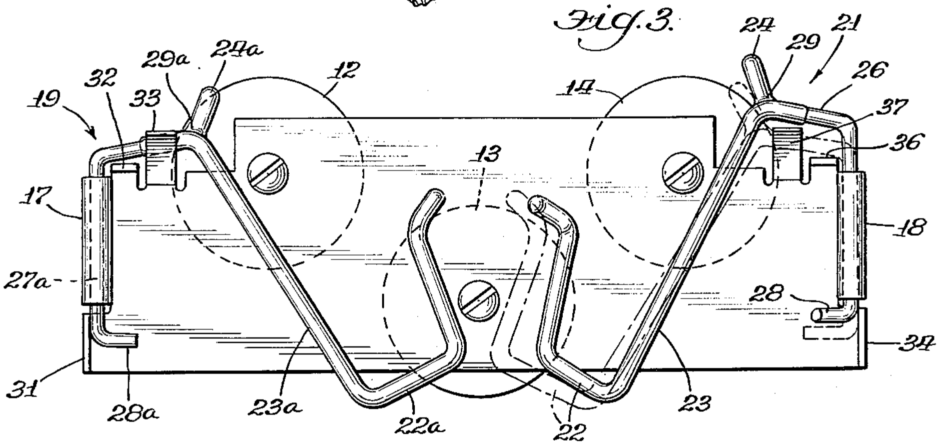
Fig. 3 is a front view of the rack showing one of its arms in two different positions.

When it is desired to use the rack to support a radio receiver the arm 21 is moved upwardly with the shank 27 sliding within the sleeve 18 from the position shown in phantom in Fig. 3 to the solid line position so that the portion 26 clears the top of the lug 37. The arm is now turned further outwardly so that it extends substantially perpendicular to the plane of the mounting plate 11 and is in the position shown in Fig. 2. The portion 26 now drops outside the retaining flange 36 which cooperates with the flange 34 to confine the arm 21 and restrict its angular movement with respect to the plane of the mounting plate 11. The arm 19 is similarly swung into position and likewise confined by the cooperation of flange 31 and flange 32.

The portable radio receiver 41 of the type normally carried in a small case has a handle portion 43 including legs 44 and 46 and a cross piece 47, the latter housing an antenna. The handle 43 is pivotally connected to the body of the receiver 41 by means of projecting buttons such as 48, only one of which is shown in Fig. 1, but which are present on both sides of the receiver. These projections 48 are cradled in the elbow portions 22 and 22*a* of the arms 21 and 19 respectively with the radio being held closely between the arms which are confined so as to provide for such holding action. As shown in Fig. 1 the receiver 41 has a rear surface 49 which slopes somewhat with respect to the front surface 51. The rear surface 49 will generally fit against the flat window pane 16 and the arms 44 and 46 of the handle 43 will tilt backwardly toward the panel 16 resting against the portions 23 and 23*a* of the arms. The retaining fingers 24 and 24*a* fit against the inner surfaces of the handle legs 46 and 44 respectively, with the edges of the handle legs fitting against shoulders 29 and 29*a*. In this way the antenna in the cross piece 47 is in the closest possible proximity to the window 16 and the optimum reception is obtained from the receiver 41.

The present invention thus provides a handy and yet sturdy rack for firmly supporting a small portable radio receiver in the best position for picking up signals within a vehicle or building, that is with its antenna in close proximity to a window. Because of the folding arms and the means for holding them flat against the mounting plate, the rack occupies very little space when not in use and can be easily carried about in the same case as the receiver.

I claim:

1. A rack for mounting a portable radio receiver including in combination, a mounting plate, means carried on one face of said plate for securing the same to a surface, a pair of arms pivotally and slidably mounted within integral sleeve portions formed from opposite edges of said plate on the other face thereof, each of said arms including an elbow portion adapted to support a projection extending from a side of a portable radio receiver, a pair of integral projections formed from the edges of said plate and extending from said other face of said plate near the ends of said sleeve portions, each of said arms bearing against one of said projections when spread apart by the receiver supported therebetween and thereby being held in fixed angular positions with respect to said plate, and a pair of lug members each formed from the upper edge of said plate and projecting from said other face of said mounting plate, said lug members having a portion extending above the arc of rotation of a portion of said arms when pivoted in their lowest position in said sleeve portions, whereby said arms may be slidably raised, pivoted towards one another and over said portion of said lug members and then lowered in a compact folded position against said other face of said plate.

2. A rack for mounting a portable radio receiver including in combination, a mounting plate, means carried on one face of said plate for securing the same to a surface, a pair of arms slidably and pivotally mounted at opposite edges of said plate on the other face thereof, said arms being slidably raised and pivoted from a first position flush against said other face of said plate which provides a compact unit to a second projecting position for supporting a portable receiver, each of said arms including a generally J-shaped portion with the long part thereof inclined toward the plane of said plate and the elbow part thereof adapted to engage a part of the portable receiver when in said second position, each of said arms having a finger thereon near the upper end of said J-shaped portion forming a shoulder portion adapted to support an edge portion of a handle of a portable radio receiver mounted on said rack, and a pair of integral projections formed from edges of said plate and extending from said plate adjacent each of said arms, one projection of each pair being in and terminating above the arc of rotation of a portion of each of said arms when in said second position to thereby retain said arms in said first positions with respect to said plate, the other projection of each pair being in the arc of rotation of said arms to prevent movement thereof away from one another when in said second position.

3. A rack for mounting a portable radio receiver including in combination, a mounting plate, suction cups carried on one face of said plate for securing the same to a surface, integral sleeve portions formed from opposite side edges of said plate on the other face thereof, a pair of arms pivotally and slidably mounted within said sleeve portions, each of said arms including an elbow portion adapted to engage and support a portable radio receiver, each of said arms including a straight shank portion within said sleeve portion and extending therebeyond to allow said arm to be slidably raised therein for pivotal movement to an extended position, said arms having turned-out portions at opposite ends of each shank for limiting the sliding movement thereof, and a pair of integral projections formed from an edge of said plate and extending from said other face of said plate adjacent each of said arms, said turned-out portion of each arm at the lower ends of said shank portion bearing against one of said projections to thereby retain said arms in fixed angular positions with respect to said plate when said arms are in their respective extended positions with the receiver supported thereby, and a pair of integral lug members formed from an edge of said plate and extending into and terminating above the normal arc of rotation of the upper turned-out portions, said arms being retainable in a compact folded position against said plate by slidably raising and pivoting the upper turned-out portions over said lug members and then lowering the same between said lug members and said plate.

4. A rack for mounting a portable radio receiver having portions projecting from opposite ends of the receiver including in combination, a substantially planar mounting plate having a pair of integral sleeve portions on one face thereof which are formed from the opposite side edges of said plate, a first pair of integral projections formed from said opposite side edges of said plate and extending from said one face thereof individually adjacent the outer edge and lower end of each of said sleeve portions, a second pair of integral projections formed from the upper edge of said plate and extending from said one face thereof individually adjacent but slightly above the upper end of each of said sleeve portions, a pair of arms adapted to cradle the projecting portions of the radio receiver for holding the same therebetween, each of said arms having a straight shank portion individually and rotatably received in said sleeve portions so that said arms may be pivoted from a folded position against said one face of said plate to an extended position wherein the arms extend from said one face of said plate for receiving the radio receiver, said shank portion being longer than said sleeve portion to permit axial sliding movement of said shank portion therein so that said arms may be raised and lowered with respect to said plate, each of said arms having a pair of co-planar turned-out portions at the opposite ends of each shank portion for limiting the axial sliding movement of said shank in said sleeve portions, the turned-out portion at the lower end of each shank portion bearing against the inner side of said first projection to prevent pivotal movement of said arms beyond the extended position thereof in both the raised and lowered positions thereof, the turned out portions at the upper end of each shank portion bearing against the outer edge of said second projection in the lowered positio n of said arms which together with said first projections retains said arms in their unfolded position, a third pair of integral projections formed from the upper edge of said plate adjacent said second projections and extending upwardly at an angle from said one face thereof with the outer end thereof terminating above the arc of rotation of the upper turned-out portions in all but the raised position of said arms, said third projections retaining said upper turned-out portions of said arms to hold them against said one face of said plate in the folded and lowered positions thereof, and means for securing said plate to a surface for holding said rack with the radio receiver supported therein for radio reception.

References Cited in the file of this patent

UNITED STATES PATENTS

| | | |
|---|---|---|
| 725,678 | Cullum | Apr. 21, 1903 |
| 1,805,984 | Hull | May 19, 1931 |
| 2,085,969 | Gedeonoff | July 6, 1937 |
| 2,231,128 | Krantz | Feb. 11, 1941 |
| 2,684,226 | Sundell | July 20, 1954 |
| 2,797,886 | Pinckney | July 2, 1957 |